(12) United States Patent
Frolov

(10) Patent No.: US 10,807,174 B2
(45) Date of Patent: Oct. 20, 2020

(54) SAW BLADE HEIGHT ADJUSTMENT MECHANISM

(71) Applicants:Robert Bosch Tool Corporation, Broadview, IL (US); Robert Bosch GmbH, Stuttgart (DE)

(72) Inventor: Andrew Frolov, Glenview, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/899,880

(22) Filed: Feb. 20, 2018

(65) Prior Publication Data
US 2019/0255632 A1    Aug. 22, 2019

(51) Int. Cl.
| | | |
|---|---|---|
| *B23D 45/06* | (2006.01) | |
| *F16H 19/02* | (2006.01) | |
| *F16H 55/10* | (2006.01) | |
| *F16H 55/08* | (2006.01) | |
| *F16H 25/20* | (2006.01) | |
| *F16H 55/06* | (2006.01) | |

(52) U.S. Cl.
CPC .......... *B23D 45/068* (2013.01); *F16H 19/02* (2013.01); *F16H 25/20* (2013.01); *F16H 55/08* (2013.01); *F16H 55/10* (2013.01); *F16H 55/06* (2013.01); *F16H 2055/0866* (2013.01)

(58) Field of Classification Search
CPC .......... B23D 45/068; B23D 45/06–068; F16H 3/426; F16H 55/10; F16H 2055/0866; F16H 1/24; F16H 55/0806; F16H 55/0813; F16H 19/02; F16H 25/20; F16H 55/06; Y10T 74/1966; Y10T 74/19656
See application file for complete search history.

(56) References Cited

U.S. PATENT DOCUMENTS

| | | | | |
|---|---|---|---|---|
| 6,525 A | * | 6/1849 | Tanlin ..................... | F16H 55/06 74/439 |
| 415,755 A | * | 11/1889 | Whiteley ................ | F16H 55/06 74/460 |

(Continued)

FOREIGN PATENT DOCUMENTS

| | | | | |
|---|---|---|---|---|
| JP | 59137660 A | * | 8/1984 | ............. F16H 55/06 |
| JP | 61055472 A | * | 3/1986 | ........... G04B 13/028 |

*Primary Examiner* — Jason Daniel Prone
*Assistant Examiner* — Samuel A Davies
(74) *Attorney, Agent, or Firm* — Maginot, Moore & Beck LLP

(57) ABSTRACT

A table saw includes a table assembly having a top surface, a cutting assembly, and an adjustment assembly. The cutting assembly is arranged below the table assembly and is movable relative to the top surface. The adjustment assembly includes an input member connected to a first gear and an output member connected to a second gear and to the cutting assembly. The first and second gears include first and second gear bodies and first and second pluralities of pins projecting from the gear bodies. Rotation of the input member causes rotation of the first gear about a first axis, and rotation of the second gear about a second axis causes rotation of the output member which causes the cutting assembly to move. The second pins engage the first pins in such a way that rotation of the first gear causes rotation of the second gear.

20 Claims, 8 Drawing Sheets

(56) References Cited

U.S. PATENT DOCUMENTS

| | | | | |
|---|---|---|---|---|
| 620,074 A * | 2/1899 | Jamieson | F16H 1/24 | 74/416 |
| 642,990 A * | 2/1900 | Lloyd | F16H 55/10 | 74/415 |
| 2,448,164 A * | 8/1948 | Woditsch | A63H 33/042 | 74/416 |
| 2,852,047 A | 9/1958 | Odlum et al. | | |
| 3,011,529 A | 12/1961 | Copp | | |
| 4,699,265 A * | 10/1987 | Houle | B65G 33/34 | 198/550.1 |
| 5,381,704 A * | 1/1995 | Knotts | F16H 1/12 | 74/416 |
| 5,875,698 A | 3/1999 | Ceroll et al. | | |
| 6,244,149 B1 | 6/2001 | Ceroll et al. | | |
| 6,453,786 B1 | 9/2002 | Ceroll et al. | | |
| 6,820,524 B1 | 11/2004 | Ceroll et al. | | |
| 7,992,479 B2 | 8/2011 | Burke et al. | | |
| 8,616,104 B2 | 12/2013 | Frolov et al. | | |
| 9,186,734 B2 | 11/2015 | Chang | | |
| 9,505,068 B2 | 11/2016 | Frolov | | |
| 2002/0021043 A1 * | 2/2002 | Hagiwara | F16H 55/17 | 301/6.5 |
| 2002/0029648 A1 * | 3/2002 | Noguchi | F16H 55/17 | 74/461 |
| 2002/0170374 A1 * | 11/2002 | Stewart | F16H 55/08 | 74/465 |
| 2006/0053918 A1 * | 3/2006 | Asari | F16H 55/06 | 74/423 |
| 2006/0191393 A1 * | 8/2006 | Zhang | B23D 45/063 | 83/477.1 |
| 2008/0066570 A1 * | 3/2008 | Kashimura | F16H 55/06 | 74/439 |
| 2008/0173119 A1 * | 7/2008 | Suzuki | F16H 55/17 | 74/459.5 |
| 2008/0182701 A1 * | 7/2008 | Gerlich | F16H 1/16 | 475/227 |
| 2009/0000412 A1 * | 1/2009 | March | F16H 1/12 | 74/416 |
| 2010/0031765 A1 * | 2/2010 | Suzuki | B29C 45/0025 | 74/461 |
| 2011/0041667 A1 | 2/2011 | Chiang | | |
| 2011/0100183 A1 | 5/2011 | Tomaino | | |
| 2015/0101470 A1 * | 4/2015 | Chang | B23D 45/068 | 83/471.2 |
| 2015/0308555 A1 * | 10/2015 | Oberle | F16H 55/17 | 74/421 R |
| 2016/0062299 A1 * | 3/2016 | Hirose | F16H 1/00 | 74/434 |
| 2017/0225374 A1 * | 8/2017 | Brochot | B29C 45/1657 | |

\* cited by examiner

** # SAW BLADE HEIGHT ADJUSTMENT MECHANISM

TECHNICAL FIELD

This invention relates to power equipment, and in particular to a table saw.

BACKGROUND

Table saws are used in a variety of diverse applications for cutting wood products, often in the construction industry. In particular, in settings such as construction jobsites and machine shops, table saws are used to cut and shape a wide range of wood types and piece shapes. For example, framers use table saws for rough-cutting lumber, while finishing carpenters use such saws for making precise rip and miter cuts.

Such table saws are often required to suit a range of cutting and machining requirements, as they are capable of cutting workpieces at varying angles and also adjusting in height. Height adjustable table saws are particularly beneficial in that the height of the cutting blade can be raised and lowered in order to accommodate a wide variety of machining requirements.

Height adjustable table saws typically include height adjustment mechanisms configured to raise and lower the cutting blade of the table saw. For example, one such arrangement includes a pair of bevel gears having involute teeth. In this example, one of the bevel gears is connected to a horizontally oriented handle wheel while a second bevel gear is connected to a vertical shaft that is connected via a cam mechanism to the cutting blade. The gear teeth of the two bevel gears mesh with one another in order to transfer rotation of the handle wheel into a vertical movement of the cutting blade.

During a machining operation, dust and debris from the cut workpiece are produced as byproducts. The dust and debris can become lodged inside the involute teeth of the bevel gears. As a result, continued operation of the bevel gears causes the dust and debris to accumulate and become compressed between the involute teeth. Operation of the height adjustment mechanism can be compromised as a result of the dust and debris accumulation, which can cause malfunctions in the mechanism and, in some instances, damage to the bevel gears.

One current solution for reducing dust and debris contamination issues in the bevel gears is to cease operation of the table saw and clean the gear assembly to remove dust, wood chips, and other debris from the bevel gears. However, this process can be time consuming and reduces the efficiency of the table saw.

Therefore, an improved blade height adjustment mechanism would be advantageous.

SUMMARY

In one embodiment, a table saw includes a table assembly, a cutting assembly, and a height adjustment assembly. The table assembly includes a table top surface that defines a blade opening. The cutting assembly is arranged below the table assembly and is configured to be movable relative to the table top surface. The height adjustment assembly is operably connected to the cutting assembly and includes an input member, an output member, a first gear, and a second gear. The output member is operably connected to the cutting assembly and is configured such that rotation of the output member causes the cutting assembly to move relative to the table top surface. The first gear is operably connected to the input member and configured such that rotation of the input member causes rotation of the first gear about a first rotational axis. The first gear includes a first gear body and a first plurality of pins projecting from the first gear body. The second gear is operably connected to the output member and is configured such that rotation of the second gear about a second rotational axis causes rotation of the output member. The second gear includes a second gear body and a second plurality of pins projecting from the second gear body. The second plurality of pins engage the first plurality of pins in such a way that rotation of the first gear about the first axis of rotation causes rotation of the second gear about the second axis of rotation.

In some embodiments of the table saw, the first plurality of pins project from the first gear body in a direction substantially parallel to the first axis of rotation. The second plurality of pins project from the second gear body in a direction substantially parallel to the second axis of rotation.

In further embodiments of the table saw, the first axis of rotation is substantially perpendicular to the second axis of rotation.

In another embodiment of the table saw, the first gear is fixedly attached to the input member and the second gear is fixedly attached to the output member.

Additionally, in some embodiments of the table saw, the cutting assembly includes a translation member operably connected to the output member and configured to convert the rotation of the output member into translational movement of the cutting assembly.

In further embodiments of the table saw, each pin of the first plurality of pins includes a first cylindrical portion and a first tapered end cap portion, and each pin of the second plurality of pins includes a second cylindrical portion and a second tapered end cap portion.

In some embodiments of the table saw, each pin of the first and second plurality of pins has an involute shape.

In another embodiment of the table saw, each first pin of the first plurality of pins has a first length defined along a central axis of the first pin. The first cylindrical portion of each first pin defines a first cylinder length that is approximately two-thirds of the first length. Each second pin of the second plurality of pins has a second length defined along a central axis of the second pin. The second cylindrical portion of each second pin defines a second cylinder length that is approximately two-thirds of the second length.

Additionally, in some embodiments of the table saw, the first gear further includes a first plurality of ribs axially projecting from the first gear body. The second gear further includes a second plurality of ribs axially projecting from the second gear body. Each first rib of the first plurality of ribs extends radially inwardly from an outer surface of a respective first pin of the first plurality of pins. Each second rib of the second plurality of ribs extends radially inwardly from an outer surface of a respective second pin of the second plurality of pins.

In further embodiments of the table saw, the first gear further includes a first central hub member projecting axially from the first gear body and surrounding a portion of the first rotational axis. The second gear further includes a second central hub member projecting axially from the second gear body and surrounding a portion of the second rotational axis.

In another embodiment of the table saw, each first rib extends radially inwardly from the outer surface of the respective first pin to an outer circumferential surface of the first central hub member. Each second rib extends radially inwardly from the outer surface of the respective second pin to an outer circumferential surface of the second central hub member.

In some embodiments of the table saw, the first and second gears are formed of plastic.

In another embodiment of the table saw, the first and second plurality of pins each include nine pins.

In a further embodiment, a height adjustment assembly for a table saw includes an input member, an output member, a first gear, and a second gear. The output member is operably connected to a cutting assembly of the table saw and is configured such that rotation of the output member causes the cutting assembly to move relative to a table top surface of the table saw. The first gear is operably connected to the input member and is configured such that rotation of the input member causes rotation of the first gear about a first rotational axis. The first gear includes a first gear body and a first plurality of pins projecting from the first gear body. The second gear is operably connected to the output member and configured such that rotation of the second gear about a second rotational axis causes rotation of the output member. The second gear includes a second gear body and a second plurality of pins projecting from the second gear body. The second plurality of pins engage the first plurality of pins in such a way that rotation of the first gear about the first axis of rotation causes rotation of the second gear about the second axis of rotation.

In another embodiment of the height adjustment assembly, each pin of the first plurality of pins includes a first cylindrical portion and a first tapered end cap portion. Each pin of the second plurality of pins includes a second cylindrical portion and a second tapered end cap portion.

In some embodiments of the height adjustment assembly, each pin of the first and second plurality of pins has an involute shape.

Additionally, in further embodiments of the height adjustment assembly, each first pin of the first plurality of pins has a first length defined along a central axis of the first pin. The first cylindrical body portion of each first pin defines a first cylinder length that is approximately two-thirds of the first length. Each second pin of the second plurality of pins has a second length defined along a central axis of the second pin. The second cylindrical body portion of each second pin defines a second cylinder length that is approximately two-thirds of the second length.

In another embodiment of the height adjustment assembly, the first gear further includes a first plurality of ribs axially projecting from the first gear body. The second gear further includes a second plurality of ribs axially projecting from the second gear body. Each first rib of the first plurality of ribs extends radially inwardly from an outer surface of a respective first pin of the first plurality of pins. Each second rib of the second plurality of ribs extends radially inwardly from an outer surface of a respective second pin of the second plurality of pins.

In some embodiments of the height adjustment assembly, the first gear further includes a first central hub member projecting axially from the first gear body and surrounding a portion of the first rotational axis. The second gear further includes a second central hub member projecting axially from the second gear body and surrounding a portion of the second rotational axis. Each first rib extends radially inwardly from the outer surface of the respective first pin to an outer circumferential surface of the first central hub member. Each second rib extends radially inwardly from the outer surface of the respective second pin to an outer circumferential surface of the second central hub member.

In another embodiment, a method for adjusting a height of a cutting assembly of a table saw includes rotating an input member of a height adjustment assembly, engaging a first plurality of pins with a second plurality of pins, rotating a second gear about a second rotational axis, and moving the cutting assembly relative to the table top surface of the table saw. Rotating the input member causes rotation of a first gear of the height adjustment assembly about a first rotational axis. The height adjustment assembly includes an output member operably connected to the cutting assembly and a second gear operably connected to the output member. The first gear is operably connected to the input member. The first plurality of pins project from a first gear body of the first gear, and the second plurality of pins project from a second gear body of the second gear. Rotating the second gear is carried out via the engagement of the first and second plurality of pins and causes rotation of the output member. Moving the cutting assembly relative to a table top surface is carried out via the rotation of the output member.

DETAILED DESCRIPTION

Figure 1:
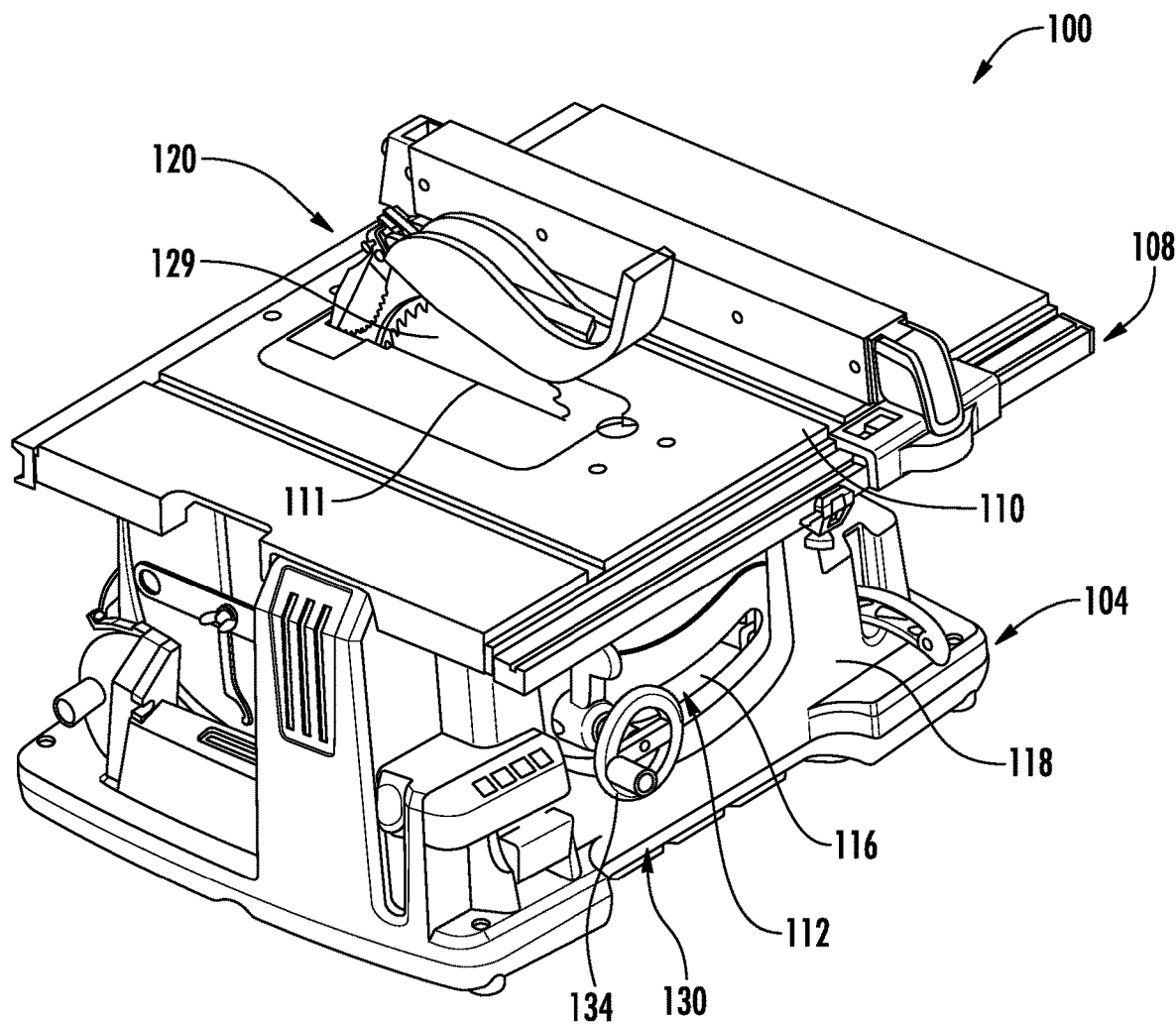
FIG. 1 is a front perspective view of a portable table saw assembly having a saw blade height adjustment mechanism.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

As used herein, the phrase "substantially parallel" and "substantially perpendicular" refer to two elements that are between zero (0) and fifteen (15) degrees, inclusive, of being parallel or perpendicular, respectively, to one another. As used herein, the term "approximately" refers to a value that is within ±10% of the reference value.

FIG. 1 illustrates a portable table saw assembly 100 that has a height adjustment assembly 130. The portable table saw assembly 100 includes a base frame 104, a main table 108, a cutting assembly 120, and an undercarriage 124. The base frame 104 supports the components of the portable table saw assembly 100 and defines an enclosure space 112 in which at least some of the components of the cutting assembly 120 and the height adjustment assembly 130 are mounted and housed. The base frame 104 includes a front surface 118 defining an arc-shaped aperture 116, through which a portion of the height adjustment assembly 130 protrudes so as to be accessible to a user of the portable table saw assembly 100.

The main table 108 is supported on the base frame 104 above the cutting assembly 120 and includes a generally planar upper surface 110 that is configured to support a workpiece during cutting and thus serves as a workpiece support surface. The main table 108 defines a blade opening 111 in the upper surface 110.

Figure 2:
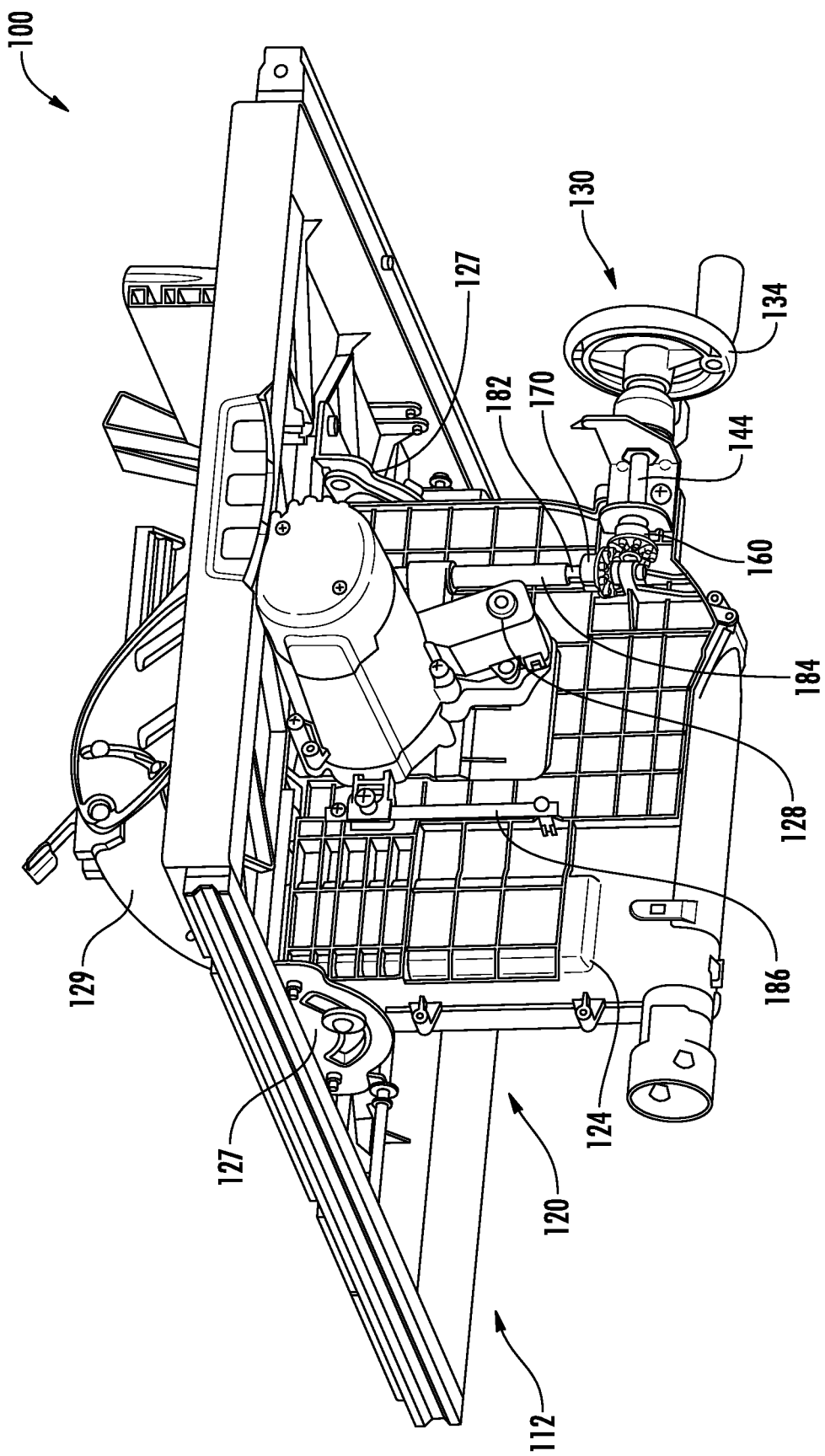
FIG. 2 is a cut-away perspective view of the portable table saw assembly of FIG. 1 with a base frame of the table saw removed for clarity.

As illustrated in FIG. 2, the cutting assembly 120 includes a motor 128 movably mounted on the undercarriage 124, and a circular saw blade 129 configured to be fixed to an arbor shaft (not shown). The motor 128 is operatively connected to the arbor shaft via, for example, a power train assembly, to rotate the arbor shaft which in turn produces a rotational cutting movement of the circular saw blade 129.

The undercarriage 124 of the portable table saw assembly 100 is mounted on a pair of supports 127 on the underside of the main table 108 and extends downwardly from the main table 108 into the enclosure space 112. The undercarriage 124 defines an interior space that encloses a bottom portion of the circular saw blade 129. The undercarriage 124 is further configured to pivot about a pivot axis, which extends longitudinally along the blade opening 111, in order to adjust a bevel cutting angle of the circular saw blade 129.

The motor 128 is mounted on an outer surface of the undercarriage 124 and is operably connected to the circular saw blade 129. As will be described in detail below, the motor 128 is mounted to the outer surface of the undercarriage 124 in such a way that the motor 128 may be raised or lowered in a vertical direction H relative to the undercarriage 124 in response to a user operating the height adjustment assembly 130.

Figure 3:
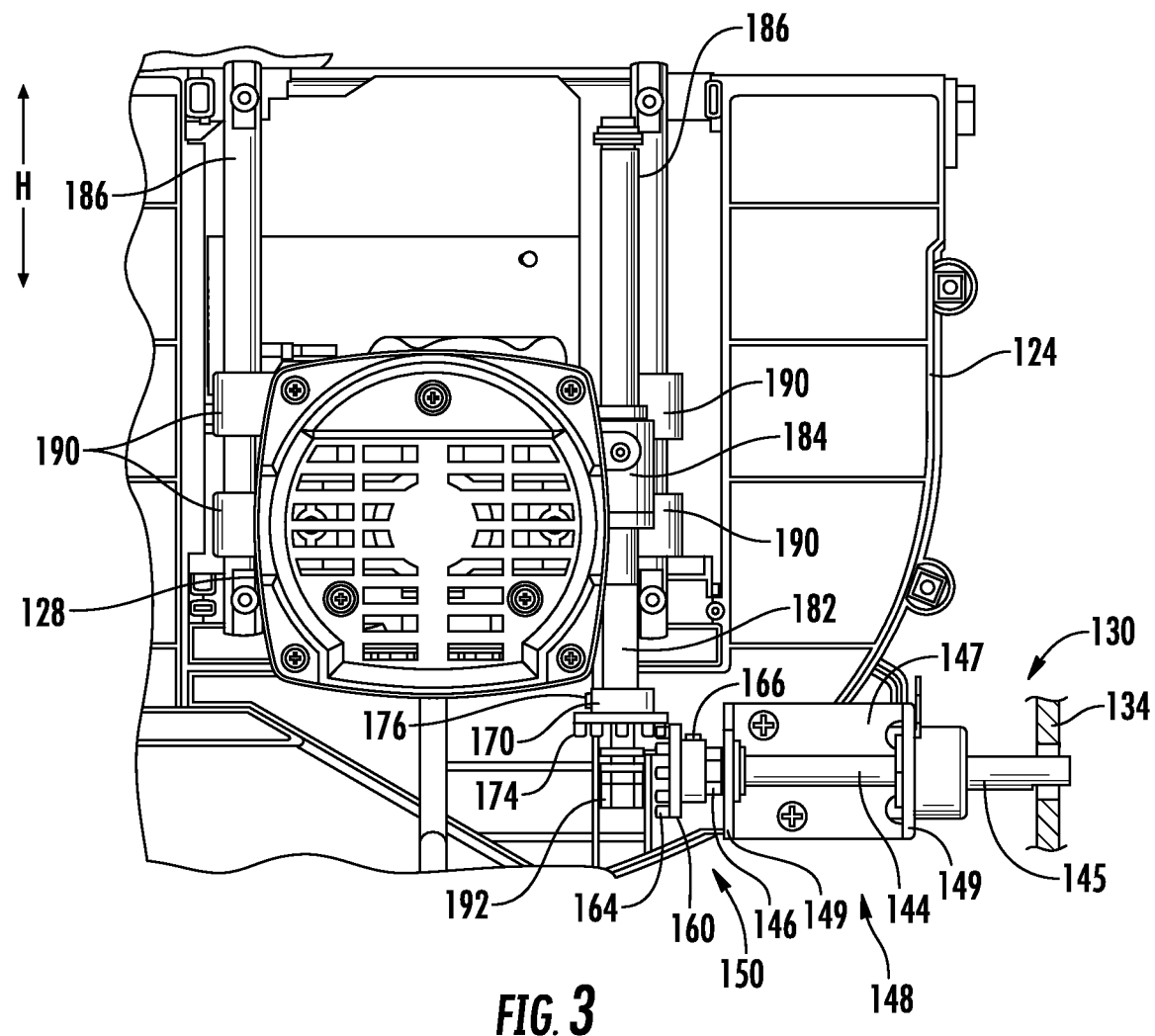
FIG. 3 is a side elevation view of the saw blade height adjustment mechanism of the portable table saw assembly of FIG. 1.
Figure 4:
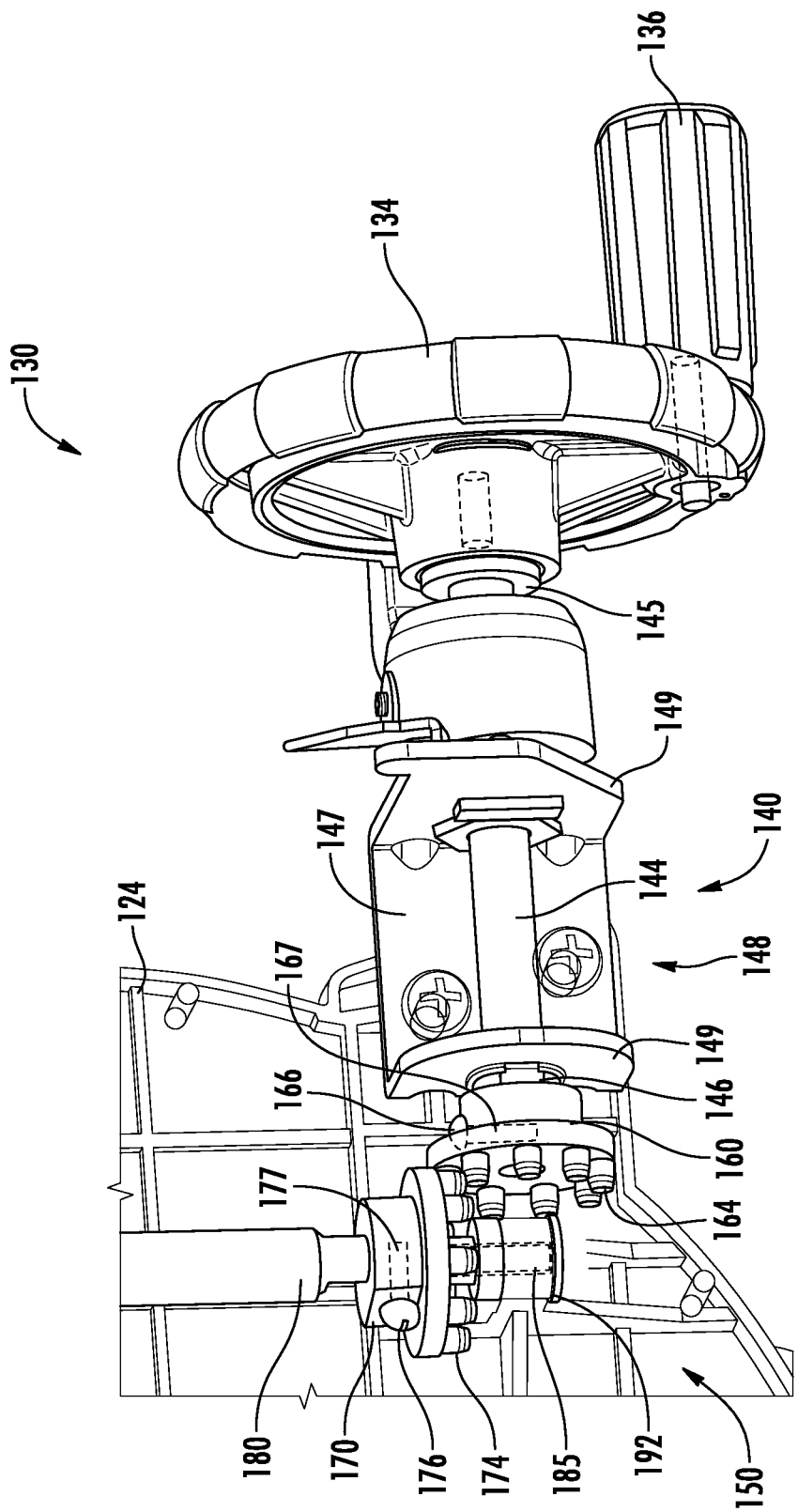
FIG. 4 is a perspective view of the saw blade height adjustment mechanism of FIG. 3.

With continuing reference to FIG. 2, and further reference to FIGS. 3 and 4, the height adjustment assembly 130 includes a horizontal shaft subassembly 140, a gear subassembly 150, and a vertical movement subassembly 180. The shaft subassembly 140 includes a shaft 144 (which can also be referred to as an input member), a mounting plate 148, and a height adjustment wheel 134. The shaft 144 is rotatably supported by the mounting plate 148, which includes a planar mounting portion 147 and two opposite end portions 149 that extend generally perpendicularly from the surface of the mounting portion 147. The mounting portion 147 is securely fastened to the undercarriage 124 with screws or other suitable fasteners. The two opposite end portions 149 each define a shaft bearing hole that receives a portion of the shaft 144 so as to support the shaft 144 and allow the shaft 144 to rotate within the mounting plate 148.

The shaft 144 includes an exterior end 145 and an interior end 146. The shaft 144 extends in a horizontal axial direction through the two shaft bearing holes in the opposite end portions 149 of the mounting plate 148. The exterior end 145 of the shaft 144 protrudes beyond the outermost end portion 149 of the mounting plate 148 and through the arc-shaped aperture 116 of the base frame 104. A height adjustment wheel 134 having a handle portion 136 is fixedly attached to the exterior end 145 of the shaft 144 that extends through the arc-shaped aperture 116 so that the height adjustment wheel 134 is accessible to a user of the portable table saw assembly 100.

Figure 5:
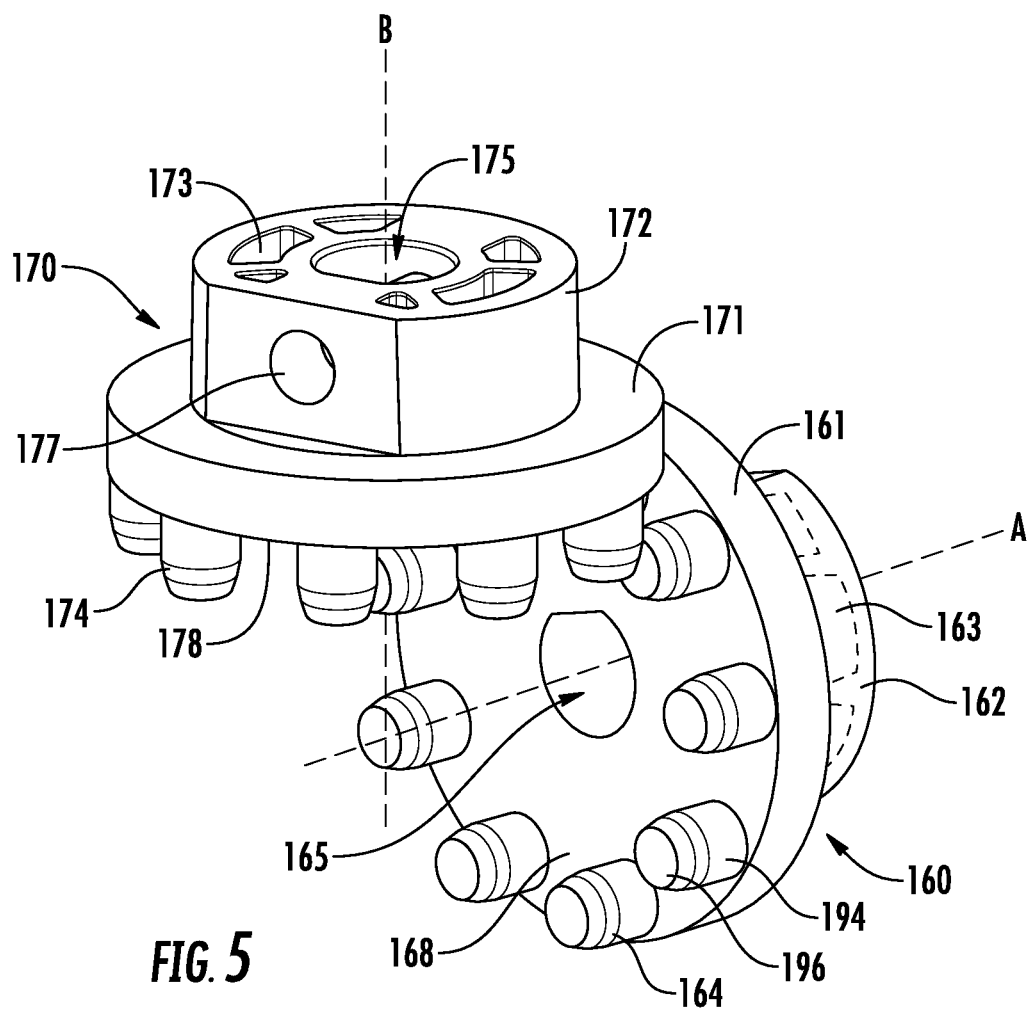
FIG. 5 is a perspective view of a pair of pin gears of the saw blade height adjustment mechanism of FIG. 3.

Referring now to FIGS. 3-5, the gear subassembly 150 of the height adjustment assembly 130 includes a first pin gear 160 and a second pin gear 170. The first pin gear 160 is fixedly attached to the innermost end 146 of the shaft 144 opposite of the height adjustment wheel 134 and is configured to rotate with the shaft 144. In the illustrated embodiment, the first pin gear 160 is fixed to the shaft 144 with a first pin 166 that extends through a first hole 167 the body of the first pin gear 160 and into a corresponding recess in the shaft 144, though in other embodiments the first pin gear 160 may be integrally formed with the shaft 144, welded to the shaft 144, or fixed to the shaft 144 in another suitable manner. The reader should appreciate that the first pin gear 160 may rotate at the same or different rotational speed as compared to the shaft 144, and in some embodiments, the first pin gear 160 may have a different rotational axis A than the shaft 144.

As illustrated in FIGS. 3-5, the first pin gear 160 includes a first gear body portion 161 and a first plurality of pins 164 projecting axially from the first gear body portion 161. The first plurality of pins 164 are arrayed in a circular arrangement adjacent to the outer circumference of the axial surface 168 of the first gear body portion 161. In one embodiment, the first plurality of pins 164 extend perpendicularly from the axial surface 168 of the first gear body portion 161, though in other embodiments the pins 164 extend from the axial surface 168 at a different angle. In further embodiments, the pins 164 extend radially outwardly from the outer circumferential surface of the first gear body portion 161.

The second pin gear 170 includes a second gear body portion 171 and a second plurality of pins 174 projecting axially from the second gear body portion 171. The second plurality of pins 174 are arrayed in a circular arrangement adjacent to the outer circumference of the axial surface 178 of the second gear body portion 171. In one embodiment, the second plurality of pins 174 extend perpendicularly from the axial surface 178 of the second gear body portion 171, though in other embodiments the pins 174 extend from the axial surface 178 at a different angle. In another embodiment, the pins 174 extend radially outwardly from the outer circumferential surface of the second gear body portion 171. The first plurality of pins 164 mesh with and engage the second plurality of pins 174 such that rotation of the first gear 160 about its rotational axis A causes rotation of the second gear 170 about its rotational axis B.

As best seen in FIG. 5, the first pin gear 160 is attached to the shaft 144 (FIGS. 2 and 3) and oriented such that the rotational axis A of the first pin gear 160 is approximately horizontal or, in other words, substantially parallel to the upper surface 110 of the main table 108. The second pin gear 170 is attached to the vertical movement subassembly 180 and oriented such that the rotational axis B of the second pin gear 170 is approximately vertical or, in other words, substantially perpendicular to the upper surface 110 of the main table 108. Thus, the rotational axis A of the first pin gear 160 is substantially perpendicular to the rotational axis B of the second pin gear 170. In one embodiment, the rotational axis A of the first pin gear 160 is parallel to the upper surface 110 and the rotational axis B of the second pin gear is perpendicular to the upper surface 110 such that the rotational axes of the first and second pin gears 160, 170 are perpendicular to one another. In other embodiments, however, the two rotational axes are oriented differently to one another.

In the illustrated embodiment, each pin of the first and second plurality of pins 164, 174 of the first and second pin gears 160, 170 has a cylindrical lower portion 194 and a tapered end cap portion 196. The tapered end cap portions 196 of the pins 164, 174 each have an involute shape such that the end cap portions are involutes of a circle. The involute shape of the tapered end cap portions provides a smooth transition of power between the engaged pins 164, 174 since the contact between the engaged pins 164, 174 is limited to a single point. As a result, dust and debris that collects on the pins 164, 174 is urged away from the pins 164, 174 as the pins follow the involute contact path.

Although the illustrated embodiment includes cylindrical base portions having tapered end cap portions, in other embodiments, the pins have a different shape. For example, in various embodiments, the pins of the pin gears have conical, fully cylindrical, or spherical profiles.

As illustrated in FIG. 5, each pin of the first plurality of pins 164 is evenly spaced apart from the adjacent pins 164 around the outer circumference of the first pin gears 160. Likewise, each pin of the second plurality of pins 174 is evenly spaced apart from the adjacent pins 174 around the outer circumference of the second pin gear 170. In the embodiment of FIG. 5, the first plurality of pins 164 and the second plurality of pins 174 have identical shapes and sizes. Adjacent pins of the first and second plurality of pins 164, 174 are separated from one another along the circumferential direction by a distance that is approximately equal to a cross-sectional diameter of the pins 164, 174. However, in other embodiments, the distance between adjacent pins 164, 174 is different. Further, in some embodiments, the pins 164, 174 of one of the first and second gears 160, 170 is larger than the pins 164, 174 of the other of the first and second gears 160, 170. In such an embodiment, the spacing between adjacent pins of the first plurality of pins 164 is approximately equal to the diameter of each of the second plurality of pins 174, and the spacing between adjacent pins of the second plurality of pins 174 is approximately equal to the diameter of each of the first plurality of pins 164.

The pins 164, 174 have an axial length measured from base of the cylindrical portion 194, at the axial surfaces 168, 178 of the respective first and second pin gears 160, 170, to the outer tip of the tapered end cap portion 196 that is greater than the cross-sectional diameter of the pins 164, 174. In one embodiment, the axial length of the pins is between 5% and 25% greater than the cross-sectional diameter of the pins 164, 174. As illustrated in the embodiment of FIG. 5, the axial length of the tapered end cap portion 196 of each of the pins 164, 174 is approximately one third of the axial length of the pins 164, 174, while the cylindrical portion 194 of the pins 164 is approximately two-thirds of the axial length of the pins 164, 174. In other embodiments, however, the tapered end cap portions 196 may be a greater or lesser percentage of the axial length of the pins.

In the illustrated embodiment, the first and second pin gears 160, 170 are identical in design. In the embodiment of FIG. 5, the first and second pin gears 160, 170 each have nine (9) pins extending from the respective base body portion 161, 171. However, in other embodiments, the first and second pin gears 160, 170 each have more or less than nine pins, for example 6, 7, 8, 10, 11, 12, or more pins. In some embodiments, the first gear 160 may have more or less pins than the second gear 170, thus providing a gear reduction. A gear reduction can allow for more precise vertical positioning of the circular saw blade 129 in response to rotation of the height adjustment wheel 134 by a user.

The pin gears 160, 170 each further include a generally circular hub member 162, 172 projecting axially from the respective base member 161, 171. In the illustrated embodiment, the hub members 162, 172 have a diameter that is less than a diameter of the base members 161, 171.

Although the pin gears 160, 170 shown in the illustrated embodiment are identical in design, the reader should appreciate that the pin gears 160, 170 may have different configurations. For example, in one embodiment, the base and hub members of one gear are sized differently than the base and hub members of the other gear in order to provide increased structural support for one of the gears.

In one embodiment, the pin gears 160, 170 are formed by injection molding. In other embodiments, the pin gears 160, 170 are formed by sintering, casting, forging, powder metallurgy, machining, or another desired process. Additionally, in some embodiments, the pin gears are formed of plastic, for example polycarbonate, polyvinyl chloride (PVC), polypropylene, acrylonitrile buradiene tyrene (ABS), or another suitable plastic. In other embodiments, the pin gears are formed of another desired material, for example aluminum, steel, or another metal or metal alloy. The base members 161, 171 are substantially solid so as to rigidly support the first and second plurality of pins 164, 174. The hub members 162, 172, on the other hand, may have hollow portions in order to reduce the overall material quantity of the pin gears 160, 170. For example, if the pin gears 160, 170 are formed via injection molding, the hub members 162, 172 may include a plurality of holes 163, 173 so as to reduce the weight and material requirements of the pin gears 160, 170. Each pin gear 160, 170 may also be formed with a central hole 165, 175 that penetrates the entire body of the gear, or the hole 165, 175 may only penetrate far enough to allow the shaft 144 and an externally threaded screw member 182 (which can also be referred to as an output member) of the vertical movement subassembly 180 to be inserted into the top of the gear.

Referring again to FIG. 3, the second pin gear 170 is connected to the vertical movement subassembly 180, which includes the elongated externally threaded screw member 182, an internally threaded nut member 184 (which can also be referred to as a translation member), guide rods 186, and guide sleeves 190. The second pin gear 170 is fixedly attached to the bottom end of the externally threaded screw member 182 and is configured to rotate with the externally threaded screw member 182. In the illustrated embodiment, the second pin gear 170 is fixed to the externally threaded screw member 182 with a second pin 176 that extends through a second hole 177 in the body of the second pin gear 170 and into a corresponding recess in the externally threaded screw member 182, though in other embodiments the second pin gear 170 may be integrally formed with the screw member 182, welded to the screw member 182, or fixed to the screw member 182 in another suitable manner. The reader should appreciate that the second pin gear 170 may rotate at the same or different rotational speed as compared to the externally threaded screw member 182 and may have a rotational axis B that differs from the rotational axis of the externally threaded screw member 182.

The externally threaded screw member 182 includes a cylindrical shaft having external threads on an outer surface of the cylindrical shaft. The externally threaded screw member 182 is oriented vertically and is arranged so as to run parallel to the outer surface of the undercarriage 124 and perpendicular to the top surface 110 of the main table 108. The length of the externally threaded screw member 182 is at least equal to the distance by which the circular saw blade 129 can be raised or lowered. However, in other embodiments, the screw member 182 may have a different height as desired for alternative requirements of the height adjustment assembly 130.

With continuing reference to FIG. 3, the externally threaded screw member 182 is vertically oriented relative to the outer surface of the undercarriage 124 such of the axis of rotation of the second pin gear 170 is substantially perpendicular to the axis of rotation of the first pin gear 160. As best seen in FIGS. 4 and 8, the externally threaded screw member 182 also includes a bottom portion 185 that extends through and beyond the second pin gear 170 and into a mounting cylinder 192. The mounting cylinder 192 is fixedly mounted to the outer surface of the undercarriage 124 and rotatably supports the externally threaded screw member 182.

Referring now to FIGS. 2 and 3, the guide rods 186 are fixed with respect to the undercarriage 124 and arranged in a vertical orientation. The motor 128 includes guide sleeves 190 that extend outwardly from opposite sides of the motor 128 and that are each configured to encompass a respective guide rod 186 so as to permit the motor 128 to slide along the path of the guide rods 186 in the vertical direction H.

The motor 128 further includes an internally threaded nut member 184 that is fixedly coupled to the motor 128 on a side of the motor 128 facing the externally threaded screw member 182. Interior threads of the internally threaded nut member 184 engage the external threads of the externally threaded screw member 182 such that rotation of the externally threaded screw member 182 causes the internally threaded nut member 184, and thus the motor 128, to move vertically along the length of the externally threaded screw member 182.

In operation, the height adjustment assembly 130 raises and lowers the height of the circular saw blade 129 with respect to the upper surface 110 of the main table 108. In order to operate the height adjustment assembly 130, a user first rotates the height adjustment wheel 134 either via the rotatable handle portion 136 or by directly engaging the height adjustment wheel 134. Rotation of the height adjustment wheel 134 causes the shaft 144 to rotate, which in turn rotates the first pin gear 160. The first plurality of pins 164 of the first pin gear 160 operatively engage with the second plurality of pins 174 of the second pin gear 170 such that rotation of the first pin gear 160 about the rotational axis A of the first pin gear 160 causes an rotation of the second pin gear 170 about the rotational axis B of the second pin gear 170.

The rotation of the second pin gear 170 causes rotation of the externally threaded screw member 182 within the internally threaded nut member 184. Since the motor 128 is fixedly coupled to the internally threaded nut member 184, rotation of the externally threaded screw member 182 within the internally threaded nut member 184 causes the motor 128, and thus the circular saw blade 129, to raise and lower on the guide rods 186 with respect to the portable table saw assembly 100. Therefore, rotating the height adjustment wheel 134 raises and lowers the motor 128 and the circular saw blade 129 operatively attached to the motor 128 with respect to the portable table saw assembly 100.

Figure 6A:
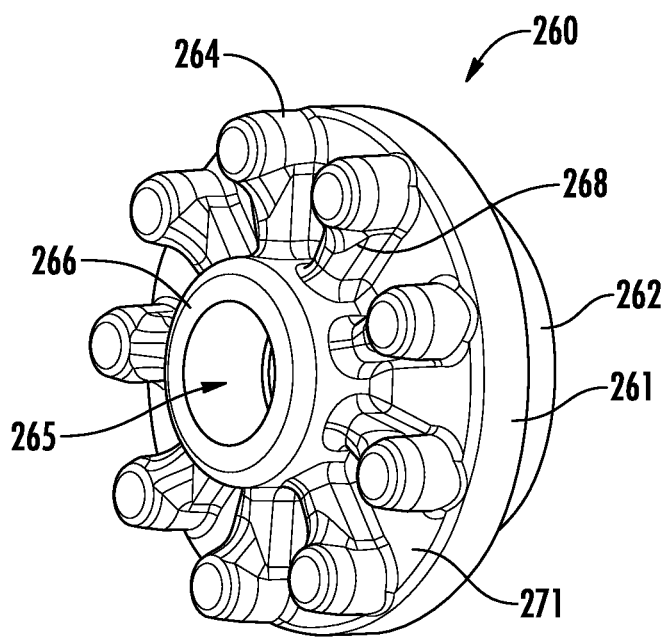
FIG. 6A is a perspective view of another pin gear for the saw blade height adjustment mechanism of the portable table saw assembly of FIG. 1.
Figure 6B:
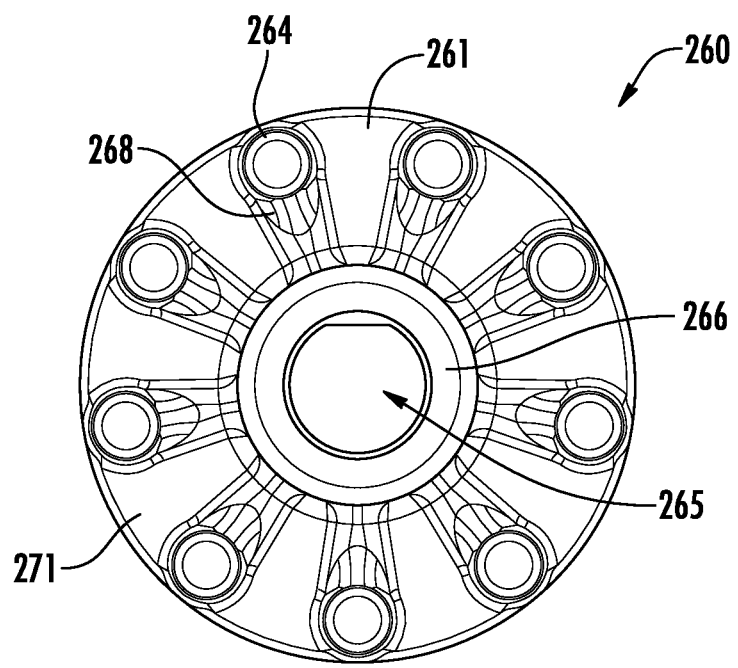
FIG. 6B is a front view of the pin gear of FIG. 6A.
Figure 7:
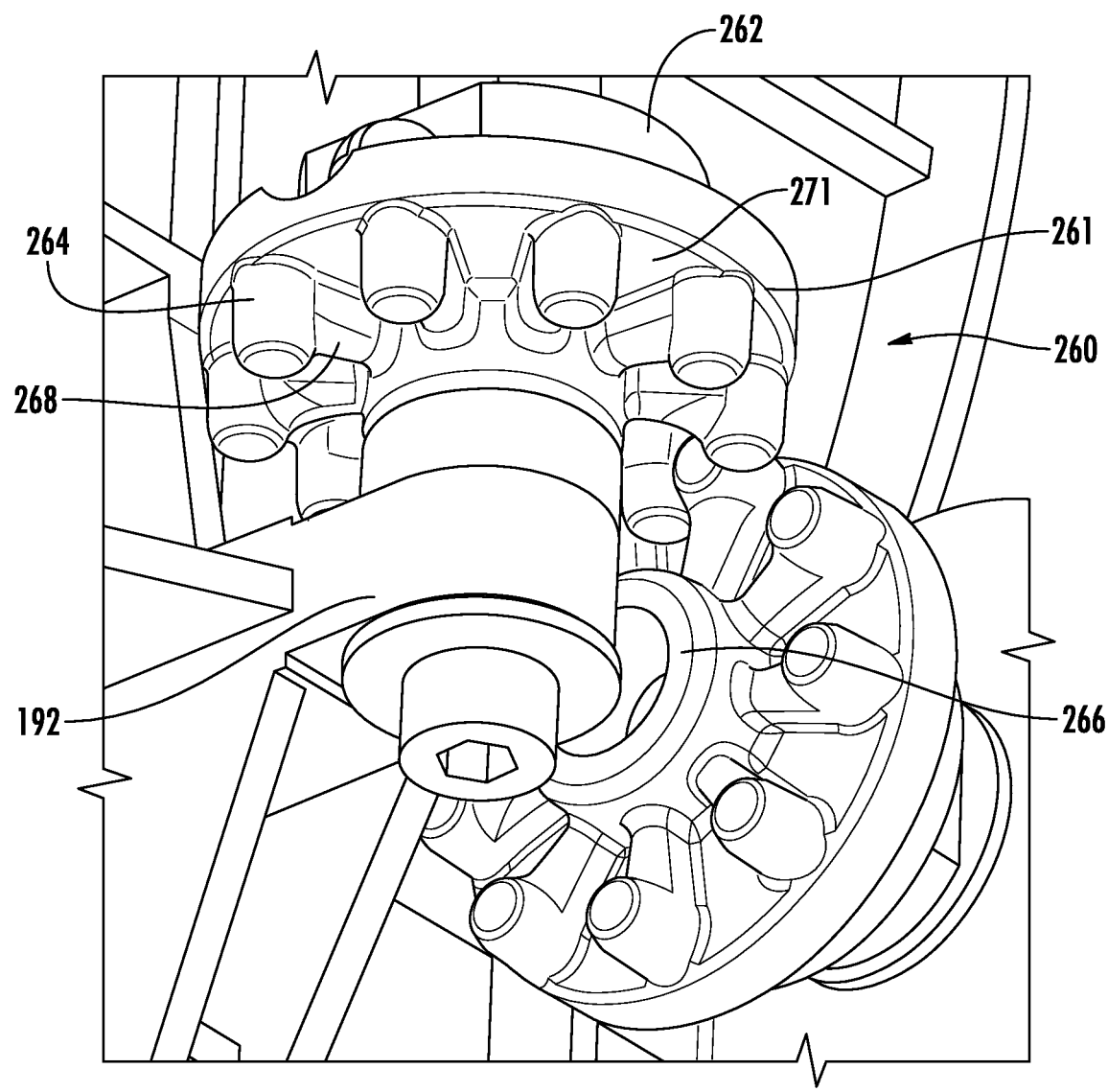
FIG. 7 is a perspective view of an assembled pair of the pin gears of FIGS. 6A and 6B in the saw blade height adjustment mechanism of the table saw of FIG. 1.

FIGS. 6A, 6B, and 7 illustrate a pin gear 260 of the portable table saw assembly 100 that is used in place of one or both of the pin gears 160, 170 of the embodiment of FIGS. 1-5. The pin gear 260 includes a plurality of pins 264, a base body member 261, and hub member 262. The base and hub members 261, 262 of the pin gear 260 are substantially identical to the base and hub members 161, 171 of the pin gears 160, 170 described above. The pin gear 260 further includes a central support member 266 that is arranged concentrically with and surrounds the central hole 265. The central support member 266 is configured as a hollow cylinder that extends an axial distance away from the axial surface 271 of the pin gear body member 261 that is approximately equal to the axial length of the plurality of pins 264.

The pin gear 260 also includes a plurality of ribs 268 arranged on the axial surface 271 of the pin gear 260. Each rib of the plurality of ribs 268 extends from a radially inner portion of the circumferential surface of the cylindrical portion of each pin of the plurality of pins 264 to a radially outer portion of the circumferential surface of the central support member 266. In the illustrated embodiment, the total number of ribs 268 is equal to the total number of pins 264, though in other embodiments the pin gear 260 includes fewer or more ribs 268 than the quantity of pins 264. As shown in FIG. 6A, the plurality of ribs 268 protrude axially from the axial surface 271 of the pin gear 260 by a distance that is approximately half of the axial length of the plurality of pins 264 and the central support member 266. The plurality of ribs 268 have a width that is approximately equal to the cross-sectional diameter of the plurality of pin 264, and may include a slight taper in the direction towards the center of the pin gear 260, as shown in FIG. 6B.

The plurality of ribs 268 and the central support member 266 provide increased structural rigidity and strength to the pin gear 260. As such, the gears of the height adjustment assembly 130 may withstand greater load forces if required while nonetheless reducing dust and debris accumulation on the gears. For example, larger motors and/or larger circular saw blades may place a greater load on the gears of the height adjustment assembly 130, thereby requiring stronger gears. Additionally, the strengthening ribs 268 may enable the pin gear 260 to be formed of a material with less strength. For instance, the ribs 268 may enable the pin gear 260 to be formed of plastic rather than aluminum or steel, which reduces material cost and manufacturing complexity of the pin gear 260.

Figure 8A:
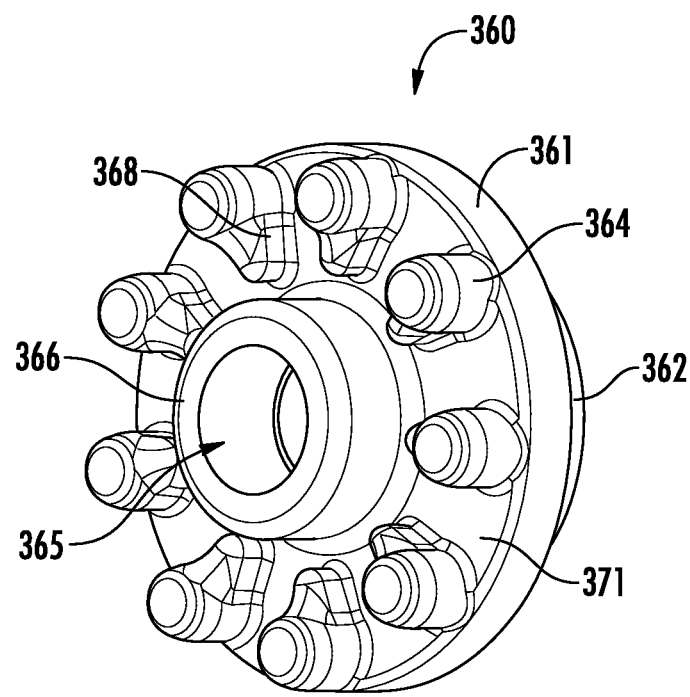
FIG. 8A is a perspective view of another pin gear for the saw blade height adjustment mechanism of the portable table saw assembly of FIG. 1.
Figure 8B:
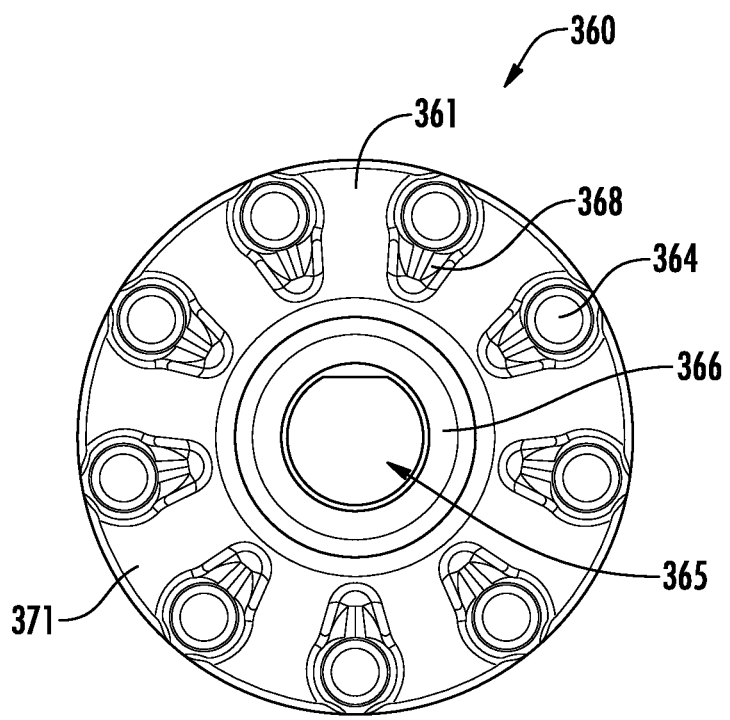
FIG. 8B is a front view of the pin gear of FIG. 8A.

FIGS. 8A and 8B depict another pin gear 360 that is used in place of one or both of the pin gears 160, 170 of the portable table saw assembly 100 of FIGS. 1-5. The configuration of the pin gear 360 is similar to the configuration of the pin gear 260 described above. The pin 360 includes a plurality of pins 364, a base body member 361, a hub member 362, a central support member 366 surrounding a central hole 365, and a plurality of ribs 368. The plurality of ribs 368 are configured in a similar manner to the plurality of ribs 268, but differ in that the ribs 368 do not fully extend from the radially inner circumferential surface of the plurality of pins 364 to the radially outer circumferential surface of the central support member 266. Instead, each rib 368 extends from the radially inner portion of the circumferential surface of the associated pin 364 to a position that is outside the outer circumferential surface of the central support member 366. As can be seen in FIG. 8A, the ribs 368 protrude from the axial surface 371 of the pin gear 360 in a sloped fashion, beginning at a height equal to or slightly less than the axial length of the pins 364 and sloping downwardly as the rib 368 extends radially inwardly towards the central support member 366. Similarly to the embodiment of FIGS. 6A, 6B, and 7, the embodiment of FIGS. 8A and 8B provides additional structural stability for the pin gear 360, but requires less material than the embodiment of FIGS. 6A, 6B, and 7.

The alternative pin gears 260, 360 shown in FIGS. 6-8 may be formed using the same methods and materials discussed above with regard to the pin gears 160, 170.

The pin gears 160, 170, 260, 360 described above transfer the rotational movement provided by the user operating the handle to the cam mechanism that moves the cutting assembly. Additionally, since the areas adjacent to the contact between pins of the pin gears 160, 170, 260, 360 are devoid of structures, wood or material chip, dust, and debris is urged out of the contact zones of the pin gears by contact between the pins, rather than accumulating on the gear assembly. The large gaps between the pins of the gears allow for debris particles to easily pass through the gear assembly, reducing or eliminating build up of debris. Thus, the gears of the table saw 100 do not require cleaning or replacement as often as in conventional table saws.

The reader should appreciate that, while the height adjustment assembly is described herein on a portable table saw, the height adjustment assembly may also be used in other table saw assemblies that require height adjustable saw blades, for example stationary table saws.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A table saw, comprising:
   a table assembly having a table top surface that defines a blade opening;
   a cutting assembly arranged below the table assembly and configured to be movable relative to the table top surface; and
   a height adjustment assembly operably connected to the cutting assembly, the height adjustment assembly comprising:
   an input member;
   an output member operably connected to the cutting assembly and configured such that rotation of the output member causes the cutting assembly to move relative to the table top surface;
   a first gear operably connected to the input member and configured such that rotation of the input member causes rotation of the first gear about a first rotational axis, the first gear comprising (i) a first gear body having a first axial surface, (ii) a first plurality of pins projecting from the first axial surface substantially parallel to the first rotational axis, and (iii) a first plurality of ribs projecting from the first axial surface by a first axial distance that is less than a first overall axial length of the first plurality of pins such that the first plurality of ribs does not extend beyond an axial end of the first plurality of pins opposite the first axial surface, each first rib of the first plurality of ribs extending radially inwardly from a surface of a respective first pin of the first plurality of pins toward the first rotational axis; and
   a second gear operably connected to the output member and configured such that rotation of the second gear about a second rotational axis causes rotation of the output member, the second gear comprising (i) a second gear body having a second axial surface, (ii) a second plurality of pins projecting from the second axial surface substantially parallel to the second rotational axis, and (iii) a second plurality of ribs projecting from the second axial surface by a second axial distance that is less than a second overall axial length of the second plurality of pins such that the second plurality of ribs does not extend beyond an axial end of the second plurality of pins opposite the second axial surface, each second rib of the second plurality of ribs extending radially inwardly from a surface of a respective second pin of the second plurality of pins toward the second rotational axis, the second plurality of pins engaging the first plurality of pins in such a way that rotation of the first gear about the first axis of rotation causes rotation of the second gear about the second axis of rotation.

2. The table saw of claim 1, wherein the first axis of rotation is substantially perpendicular to the second axis of rotation.

3. The table saw of claim 1, wherein:
   the first gear is fixedly attached to the input member; and
   the second gear is fixedly attached to the output member.

4. The table saw of claim 1, wherein the height adjustment assembly includes a translation member operably connected to the output member and configured to convert the rotation of the output member into translational movement of the cutting assembly.

5. The table saw of claim 1, wherein:
   each first pin of the first plurality of pins includes a first cylindrical portion and a first tapered end cap portion, the first tapered end cap portion defining the first axial end; and
   each second pin of the second plurality of pins includes a second cylindrical portion and a second tapered end cap portion, the second tapered end cap portion defining the second axial end.

6. The table saw of claim 5, wherein each first pin and each second pin of the first and second plurality of pins has an involute shape.

7. The table saw of claim 5, wherein:
   the first overall axial length is defined along a central axis of each first pin of the first plurality of pins;
   the first cylindrical body portion of each first pin defines a first cylinder length that is approximately two-thirds of the first overall axial length;
   the second overall axial length is defined along a central axis of each second pin of the second plurality of pins; and
   the second cylindrical body portion of each second pin defines a second cylinder length that is approximately two-thirds of the second overall axial length.

8. The table saw of claim 1, wherein:
   the first gear further comprises a first central support member projecting axially from the first axial surface and surrounding a portion of the first rotational axis; and
   the second gear further comprises a second central support member projecting axially from the second axial surface and surrounding a portion of the second rotational axis.

9. The table saw of claim 8, wherein:
   each first pin of the first plurality of pins includes a first cylindrical portion and a first tapered end cap portion, the first tapered end cap portion defining the first axial end;
   each second pin of the second plurality of pins includes a second cylindrical portion and a second tapered end cap portion, the second tapered end cap portion defining the first axial end;

each first rib extends radially inwardly from the first cylindrical portion of the respective first pin to a first outer circumferential surface of the first central support member, the first outer circumferential surface of the first central support member extending perpendicularly away from the first axial surface of the first gear body; and each second rib extends radially inwardly from the second cylindrical portion of the respective second pin to a second outer circumferential surface of the second central support member, the second outer circumferential surface of the second central support member extending perpendicularly away from the second axial surface of the second gear body.

10. The table saw of claim 1, wherein the first and second gears are formed of plastic.

11. The table saw of claim 1, wherein the first and second plurality of pins each include nine pins.

12. The table saw of claim 1, wherein:
each first pin of the first plurality of pins includes a first cylindrical portion and a first tapered end cap portion, the first tapered end cap portion defining the first axial end, each first rib extending radially inwardly from the first cylindrical portion of the respective first pin toward the first axis of rotation; and each second pin of the second plurality of pins includes a second cylindrical portion and a second tapered end cap portion, the second tapered end cap portion defining the second axial end, each second rib extending radially inwardly from the second cylindrical portion of the respective second pin toward the second axis of rotation.

13. A height adjustment assembly for a table saw, comprising:
an input member;
an output member operably connected to a cutting assembly of the table saw and configured such that rotation of the output member causes the cutting assembly to move relative to a table top surface of the table saw;
a first gear operably connected to the input member and configured such that rotation of the input member causes rotation of the first gear about a first rotational axis, the first gear comprising (i) a first gear body having a first axial surface, (ii) a first plurality of pins projecting from the first axial surface substantially parallel to the first rotational axis, and (iii) a first plurality of ribs projecting from the first axial surface by a first axial distance that is less than a first overall axial length of the first plurality of pins such that the first plurality of ribs does not extend beyond an axial end of the first plurality of pins opposite the first axial surface, each first rib of the first plurality of ribs extending radially inwardly from a surface of a respective first pin of the first plurality of pins toward the first rotational axis; and
a second gear operably connected to the output member and configured such that rotation of the second gear about a second rotational axis causes rotation of the output member, the second gear comprising (i) a second gear body having a second axial surface, (ii) a second plurality of pins projecting from the second axial surface substantially parallel to the second rotational axis, and (iii) a second plurality of ribs projecting from the second axial surface by a second axial distance that is less than a second overall axial length of the second plurality of pins such that the second plurality of ribs does not extend beyond an axial end of the second plurality of pins opposite the second axial surface, each second rib of the second plurality of ribs extending radially inwardly from a surface of a respective second pin of the second plurality of pins toward the second rotational axis, the second plurality of pins engaging the first plurality of pins in such a way that rotation of the first gear about the first axis of rotation causes rotation of the second gear about the second axis of rotation.

14. The height adjustment assembly of claim 13, wherein:
each first pin of the first plurality of pins includes a first cylindrical portion and a first tapered end cap portion, the first tapered end cap portion defining the first axial end; and each second pin of the second plurality of pins includes a second cylindrical portion and a second tapered end cap portion, the second tapered end cap portion defining the second axial end.

15. The height adjustment assembly of claim 14, wherein each first pin and each second pin of the first and second plurality of pins has an involute shape.

16. The height adjustment assembly of claim 14, wherein:
the first overall axial length is defined along a central axis of each first pin of the first plurality of pins;
the first cylindrical body portion of each first pin defines a first cylinder length that is approximately two-thirds of the first length;
the second overall axial length is defined along a central axis of each second pin of the second plurality of pins; and
the second cylindrical body portion of each second pin defines a second cylinder length that is approximately two-thirds of the second length.

17. The height adjustment assembly of claim 13, wherein:
the first gear further comprises a first central support member projecting axially from the first gear body and surrounding a portion of the first rotational axis;
the second gear further comprises a second central support member projecting axially from the second gear body and surrounding a portion of the second rotational axis;
each first pin of the first plurality of pins includes a first cylindrical portion and a first tapered end cap portion, the first tapered end cap portion defining the first axial end;
each second pin of the second plurality of pins includes a second cylindrical portion and a second tapered end cap portion, the first tapered end cap portion defining the first axial end;
each first rib extends radially inwardly from the first cylindrical portion of the respective first pin to a first outer circumferential surface of the first central support member, the first outer circumferential surface of the first central support member extending perpendicularly away from the first axial surface of the first gear body; and
each second rib extends radially inwardly from the second cylindrical portion of the respective second pin to a second outer circumferential surface of the second central support member, the second outer circumferential surface of the second central support member extending perpendicularly away from the second axial surface of the second gear body.

18. The height adjustment assembly of claim 13, wherein:
each first pin of the first plurality of pins includes a first cylindrical portion and a first tapered end cap portion, the first tapered end cap portion defining the first axial end, each first rib extending radially inwardly from the first cylindrical portion of the respective first pin toward the first axis of rotation; and each second pin of the second plurality of pins includes a second cylindrical portion and a second tapered end cap portion, the second tapered end cap portion defining the second axial end, each second rib extending radially inwardly from the second cylindrical portion of the respective second pin toward the second axis of rotation.

19. A method for adjusting a height of a cutting assembly of a table saw, comprising:

rotating an input member of a height adjustment assembly of the table saw so as to cause rotation of a first gear of the height adjustment assembly about a first rotational axis, the first gear operably connected to the input member and including (i) a first gear body having a first axial surface, (ii) a first plurality of pins projecting from the first axial surface in a direction substantially parallel to the first rotational axis, and (iii) a first plurality of ribs projecting from the first axial surface by a first axial distance that is less than a first overall axial length of the first plurality of pins such that the first plurality of ribs does not extend beyond an axial end of the first plurality of pins opposite the first axial surface, each first rib of the first plurality of ribs extending radially inwardly from a respective first pin of the first plurality of pins toward the first rotational axis, the height adjustment assembly including an output member operably connected to the cutting assembly and a second gear operably connected to the output member, the second gear including (i) a second gear body having a second axial surface, (ii) a second plurality of pins projecting from the second axial surface in a direction substantially parallel to the second rotational axis, and (iii) a second plurality of ribs projecting from the second axial surface by a second axial distance that is less than a second overall axial length of the second plurality of pins such that the second plurality of ribs does not extend beyond an axial end of the second plurality of pins opposite the second axial surface, each second rib of the second plurality of ribs extending radially inwardly from a respective second pin of the second plurality of pins toward the second rotational axis;

engaging the first plurality of pins of the first gear with the second plurality of pins of the second gear;

rotating the second gear about the second rotational axis via the engagement of the first and second plurality of pins so as to cause rotation of the output member; and moving the cutting assembly relative to a table top surface of the table saw via the rotation of the output member.

20. The method of claim 19, wherein:

each first pin of the first plurality of pins includes a first cylindrical portion and a first tapered end cap portion, the first tapered end cap portion defining the first axial end, each first rib extending radially inwardly from the first cylindrical portion of the respective first pin toward the first axis of rotation; and each second pin of the second plurality of pins includes a second cylindrical portion and a second tapered end cap portion, the second tapered end cap portion defining the second axial end, each second rib extending radially inwardly from the second cylindrical portion of the respective second pin toward the second axis of rotation.

* * * * *